United States Patent
Angeles

(10) Patent No.: US 10,469,604 B2
(45) Date of Patent: *Nov. 5, 2019

(54) SYSTEM AND METHOD FOR DETECTING AND REPORTING ONLINE ACTIVITY USING REAL-TIME CONTENT-BASED NETWORK MONITORING

(71) Applicant: Peter K Trzyna, Chicago, IL (US)

(72) Inventor: Patrick Angeles, New York, NY (US)

(73) Assignee: Peter K. Trzyna, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,975

(22) Filed: Apr. 29, 2019

(65) Prior Publication Data
US 2019/0253507 A1    Aug. 15, 2019

Related U.S. Application Data

(63) Continuation of application No. 16/180,587, filed on Nov. 5, 2018, which is a continuation of application
(Continued)

(51) Int. Cl.
*G06F 15/173* (2006.01)
*H04L 29/08* (2006.01)
*H04L 29/06* (2006.01)
*H04L 29/12* (2006.01)
*G06F 16/95* (2019.01)
(Continued)

(52) U.S. Cl.
CPC .......... *H04L 67/22* (2013.01); *G06F 11/3414* (2013.01); *G06F 11/3476* (2013.01); *G06F 11/3495* (2013.01); *G06F 16/95* (2019.01); *G06F 16/954* (2019.01); *G06F 16/9566* (2019.01); *G06F 16/986* (2019.01); *G06Q 30/02* (2013.01); *G06Q 30/0601* (2013.01); *G06Q 40/12* (2013.12); *H04L 29/06* (2013.01); *H04L 29/08072* (2013.01); *H04L 29/12066* (2013.01); *H04L 43/00* (2013.01); *H04L 61/10* (2013.01); *H04L 63/029* (2013.01); *H04L 63/0281* (2013.01); *H04L 63/166* (2013.01); *H04L 67/02* (2013.01); *H04L 69/329* (2013.01); *G06F 11/3438* (2013.01); *G06F 2201/875* (2013.01); *H04L 43/045* (2013.01); *H04L 43/06* (2013.01); *H04L 43/16* (2013.01); *H04L 63/0823* (2013.01)

(58) Field of Classification Search
CPC ......... H04L 67/22; H04L 67/02; H04L 43/00; H04L 43/045; H04L 29/12066; G04F 2201/875; G06F 11/3438
See application file for complete search history.

(56) References Cited

U.S. PATENT DOCUMENTS

| | | | | |
|---|---|---|---|---|
| 6,035,332 A | * | 3/2000 | Ingrassia, Jr. | G06F 11/3495 709/224 |
| 6,151,601 A | * | 11/2000 | Papierniak | G06Q 30/02 |
| 6,820,133 B1 | * | 11/2004 | Grove | H04L 29/12066 709/238 |

\* cited by examiner

*Primary Examiner* — Kyung H Shin
(74) *Attorney, Agent, or Firm* — Peter K. Trzyna, Esq.

(57) ABSTRACT

A computerized system and method for tracking and reporting online activity across a plurality of clients and servers is disclosed that intercepts and logs secure and non-secure HTTP request and response pages, analyzes each of the received page records, associates each page record to an event type based on user-defined parameters, identifies and extracts user-defined attributes of each page record based on its event type, and reports on the occurrence of the event along with its associated attributes.

30 Claims, 8 Drawing Sheets

Event Composition

Related U.S. Application Data

No. 15/620,721, filed on Jun. 12, 2017, now Pat. No. 10,122,809, which is a continuation of application No. 14/739,992, filed on Jun. 15, 2015, now Pat. No. 9,680,946, which is a continuation of application No. 10/013,827, filed on Dec. 11, 2001, now Pat. No. 9,058,416.

(60) Provisional application No. 60/254,609, filed on Dec. 11, 2000, provisional application No. 60/292,572, filed on May 22, 2001.

(51) Int. Cl.
*G06F 16/954* (2019.01)
*G06F 16/958* (2019.01)
*G06F 16/955* (2019.01)
*G06F 11/34* (2006.01)
*G06Q 30/02* (2012.01)
*G06Q 30/06* (2012.01)
*H04L 12/26* (2006.01)
*G06Q 40/00* (2012.01)

FIG. 1 ETS Software Architecture

FIG. 2 HTTP Proxy SSL Handling

FIG. 3 Data Identification and Extraction Entities

FIG. 4 Data Analysis Entities

FIG. 5 Event Composition

FIG. 6 ETS Production System Architecture 600

US 10,469,604 B2

SYSTEM AND METHOD FOR DETECTING AND REPORTING ONLINE ACTIVITY USING REAL-TIME CONTENT-BASED NETWORK MONITORING

REFERENCE TO RELATED APPLICATIONS

The present patent application is a continuation of U.S. patent application Ser. No. 16/180,587, filed Nov. 5, 2018, pending. U.S. patent application Ser. No. 16/180,587 is a continuation of U.S. patent application Ser. No. 15/620,721, filed Jun. 12, 2017, issuing as U.S. Pat. No. 10,122,809 on Nov. 6, 2018. U.S. patent application Ser. No. 15/620,721 is a continuation of U.S. patent application Ser. No. 14/739,992, filed Jun. 15, 2015, issuing as U.S. Pat. No. 9,680,946 on Jun. 13, 2017. Ser. No. 14/739,992 is a continuation of Ser. No. 10/013,827, filed on Dec. 11, 2001, issuing as U.S. Pat. No. 9,058,416 on Jun. 16, 2015. Ser. No. 10/013,827 claims benefit under Title 35, U.S.C. § 119(e), of U.S. Application Ser. No. 60/254,609, filed Dec. 11, 2000, and U.S. Application Ser. No. 60/292,572, filed May 22, 2001.

FIELD OF THE INVENTION

The present invention relates, in general, to systems that report online activity over public or private networks such as the Internet, World Wide Web (WWW) or a corporate local area network (LAN), and more particularly to a system and method for capturing information from client-server transmissions over a plurality 01 clients and one or more plurality of servers and detecting and reporting the occurrence of an event or transaction along with its associated attributes using real-time content-based data analysis and attribute extraction.

BACKGROUND OF THE INVENTION

The widespread use of personal computers, modems and high-speed data connections has fostered the growth of computer networks of increasing scope and complexity. The Internet serves as an example of a type of computer network that, in practice, is a large network of networks, all interconnected, wherein mail, file transfer, remote log-in, electronic commerce and other services are offered. The Internet uses a client-server architecture which is a network-based system that uses client software running on one computer to request a specific service, and uses corresponding server software running on a second computer to provide access to a shared resource managed by the second computer. The second computer then connects to the Internet, which provides the specific service requested.

In 1989 the World Wide Web (hereinafter "WWW" or the "Web") was developed by English computer scientist Timothy Berners-Lee to enable information to be shared among internationally dispersed teams of researchers at the European Organization for Nuclear Research. The Web is an application program which runs on individual computers and creates connections to multiple different source computers over one or more networks. Web files are formatted using Hypertext Markup Language ("HTML") and Web communications occur using the Hypertext Transfer Protocol ("HTTP"). The Web is a component of the Internet which allows Internet addressable resources to be connected to one another. The concept of connectivity was originally conceived by Ted Nelson in the mid 1960s as a method for making computers respond to the way humans think and require information. In Web parlance, the Web connections are called links or hyperlinks. These hyperlinks contain information, known as Universal Resource Locators ("URL's"), that directs the user to the "address" of the Internet-connected computer containing the files or information of interest. The server that contains the files is called a Web site. Web sites contain documents of which a page is called a Web page. Web pages are displayed on a computer screen as agglomerations of text or images with sounds. On Web pages, hyperlinks may be displayed as text, typically in blue, or as a graphic icon. Framing is a Web browser feature that enables a Web page to be displayed in a separate scrollable window on screen. Users operating client computers interact with the Web by utilizing application programs known as Web browsers. When connected to a Web site, users interact with Web pages by using a mouse and pointing and clicking on visual objects on the screen. Typically, the user interface is referred to as the "front end" in a system. Consequently, the "back end" is the support structure of a system that produces the front end.

The Internet continues to grow exponentially and is becoming an indispensable component of everyday life. Businesses are utilizing it to access and distribute information and increase communication both internally and externally. Millions of people currently use the Web for purposes as varied as buying cars, theatre tickets and clothes, selling antiques, collectibles and real estate, reading the news of the day and sending and receiving electronic mail.

Despite the great promise of the Web as a transactional medium, obtaining reliable online activity data, especially as the data originate from a plurality of browsers and occur across a plurality of Web sites, has been difficult to obtain. A single browser may transact with several independently operated Web sites during a single browsing session. Conversely, a single Web site may transact with several, independently invoked client browsers throughout the course of its operation.

One type of prior art system for reporting online activity is a client-based computer meter. See, for example, U.S. Pat. Nos. 6,115,680 and 5,675,510 to Coffee et al., the disclosures of which are hereby incorporated specifically by reference. The meters are individually installed on participating client browsers and log Universal Resource Locator (URL) data to determine Web traffic information, such as the number of users that visit a particular Web site or Web page and the duration of their visits. However, these meters are cumbersome and difficult to deploy for a number of reasons. The first reason is that they typically require specific versions for every browser and operating system in order to work. Another reason is that such meters are typically downloaded over the network and can be several megabytes in size. For a dial up modem-equipped computer user, this download can take anywhere from several minutes up to one hour. A further reason is that the meters are limited to capturing URL data. This limits metering systems from extracting content information—particularly if the page is served using a secure communications channel such as Secure Sockets Layer (SSL), or if the content is dynamically generated upon request—and therefore precludes such systems from reporting granular transaction data. For example, quantitative transaction data such as "the total purchase price of an e-commerce purchase" is rarely encoded in the URL, and is typically securely transmitted via SSL within the content of a purchase confirmation page.

Other prior art systems for reporting online activity rely on analyzing Web server log files. See, for example, U.S. Pat. No. 6,317,787 to Boyd et al., the disclosure of which is hereby incorporated specifically by reference. A principal drawback of these systems is that they are limited to tracking access to a single Web site. Because a browsing session typically involves jumping between many different servers, no single server is able to accurately determine from its log what any given user has done over a plurality of sites. To analyze multiple sites, this system would require physical access to Web server log files of all Web sites for which transactional data is sought. In addition, Web server log file output is generally limited to data regarding Web site traffic (e.g., page views, browser usage, navigation paths), rather than qualitative data regarding transactions typically found only in served content.

Further prior art systems for reporting online activity rely on cooperative systems or "affiliate networks" in which individually operated Web sites report transaction data to a centralized server or repository. See, for example, U.S. Pat. No. 5,991,740 to Messer, the disclosure of which is hereby incorporated specifically by reference. A number of problems exist with respect to using affiliate networks as a means of obtaining transactional data. A principal limitation of such systems is that each discrete Web site must be individually engineered to monitor transactions between affiliated entities and to send the transaction data to the central repository. As a result, the engineering effort required to join the affiliate network represents a development cost and risk that most sites may not be willing to bear. Furthermore, this system cannot access data regarding transactions on a Web site that is not affiliated with the network. Another problem with these systems is that it does not provide an independent analysis of the reported data; rather, it relies on faith that a Web site correctly and accurately reports its transactions.

Still further prior art systems for reporting online activity rely on the integration or insertion of JavaScript or transparent images (also known as clear gifs, Web bugs or beacons) in each Web page for which transaction activity is to be reported. These systems have similar limitations to the aforementioned affiliate network systems. These systems require the Web site operator to modify or program specific Web pages within a Web site in order to transmit data regarding transactions. As with affiliate network systems, these systems do not provide an independent analysis of the reported data.

SUMMARY OF THE INVENTION

In view of the above problems associated with the related art, in one embodiment, the present invention provides a system and method for tracking and reporting online activity across a plurality of clients and servers that utilizes a real-time content-based network monitoring, data analysis and data extraction to report online activity.

The present invention in a preferred embodiment provides a system and method for tracking and reporting online activity across a plurality of clients and servers that employs a content-based event detection and data extraction mechanism to accurately detect events and extract related data from both static and dynamically generated pages.

In a further embodiment, the present invention provides a system and method for tracking and reporting online activity across a plurality of clients and servers that is able to track and report online activity as they are conducted through a secure communications channel such as the Secure Sockets Layer (SSL).

In another embodiment of the present invention, there is provided a system and method for tracking and reporting online activity across a plurality of clients and servers without requiring the installation of a browser plug-in or any other client-side program.

In yet another embodiment, the present invention provides a system and method for tracking and reporting online activity across a plurality of clients and servers without requiring programming or other modification to Web sites in order that they may publish online activity information to a centrally available repository and to other devices, for the purpose of providing notice of the activity and content relating to that activity.

Preferably, the present invention provides a system and method for tracking and reporting online activity across a plurality of clients and servers without requiring the manual insertion of JavaScript, Web beacon or any other computer code or file to a Web page for the purpose of reporting online activity.

In another embodiment, the present invention encompasses a system and method for tracking and reporting online activity across a plurality of clients and servers which provides a highly configurable, data-driven capability to track and report online activity captured from new sites as they become accessible on the Web, or from existing sites as they are modified by their operators.

Furthermore, the present invention contemplates a system and method for tracking and reporting online activity across a plurality of clients and servers which provides a highly configurable, data-driven capability to track and report new types of events as they become available over the Web.

Provided herein in a preferred embodiment is a computerized system and method for tracking and reporting online activity across a plurality of clients and servers which intercepts and logs secure and non-secure HTTP request and response pages, analyzes each of the received page records, associates each page record to an event type based on user-defined parameters, identifies and extracts user-defined attributes of each page record based on its event type, and reports on the occurrence of the event along with its associated attributes.

The Event Tracking System (ETS) embodying an aspect of the present invention effectively reports on many different types of known online activity and data including but not limited to: purchases from the sale of goods and services online, online shopping cart abandonment, airline ticket reservations, credit card type usage, user account creation, and contest or sweepstake entries. In accord with the present invention, ETS provides event specific attributes such as purchase amounts, cart item names, travel dates, email addresses and zip codes. Traditional types of online activity data such as page view counts and session durations that are currently reported by existing prior art systems are likewise provided.

An embodiment of the system and method of the present invention makes use of a proxy agent for the purpose of capturing HTTP transmission records. According to HTTP guidelines, browsers and Web sites communicate through a client-server protocol in which browsers act as clients and Web sites act as servers. Browsers send HTTP requests to Web sites, which in turn send HTTP responses that may communicate content or status codes such as HTML data, application data, images or error messages. A proxy agent acts both as a server and a client by accepting requests from client browsers, initiating requests to Web servers on behalf of the clients, receiving responses from Web servers, and forwarding the responses back to the client browsers. As such, a proxy agent is an ideal central point wherein client-server transmissions across a plurality of clients and servers may be captured and recorded.

According to the present invention, event analysis is applied to the HTTP transmission stream once it has been recorded. As similar types of events are manifested idiosyncratically across individual Web sites, the system possesses a high degree of configurability that allows a system operator to define the conditions under which a particular event may occur on a particular site. The system operator may also specify where and how to extract event related attributes from the content of the recorded pages.

The various embodiments disclosed herein include:

A. A microprocessor-controlled system for tracking electronic commerce activity across a distributed computer network, the system comprising: random access memory comprising: software executable on a microprocessor for data collection and acquisition; and software executable on a microprocessor for data management and processing; and a microprocessor for execution of the data collection and acquisition software and the data management software. Also disclosed is the system, wherein the distributed computer network comprises a plurality of clients and servers.

B. A method for continuous event monitoring over a distributed computing network, comprising: (a) rewriting an original URL such that a browser request from a browser to the original URL is received by a proxy; (b) receiving the browser request at the proxy; (c) sending a proxy request to the original URL; (d) receiving a response from a host of the original URL; (e) rewriting all URLs embedded in the response such that a browser request to each of the embedded URLs is received by the proxy; and (f) serving the response to the browser.

C. A method for tracking user activity in a distributed computer network, comprising the steps of: (a) capturing data relating to user activity on the distributed network; (b) storing captured data in a central database; (c) extracting relevant data from the database based upon pre-determined selection parameters to form parameter data sets; (d) dynamically maintaining the pre-determined selection parameters based upon revisable, operator-defined instructions on how to select and extract information from a text page; and (e) analyzing the parameter data sets to predict future user activity. Also disclosed is the method wherein the distributed network comprises a plurality of clients and servers. Additionally, disclosed is the method wherein the text page is encoded with HTML and accessible over the Internet. Further disclosed is the method wherein the user activity occurs over a secure communications channel. In addition, disclosed is the method wherein the secure communications channel is Secure Sockets Layer (SSL). Yet also disclosed is the method wherein the data relating to user activity is captured by using an URL-rewriting proxy agent. Yet further disclosed is the method wherein the data relating to user activity is captured by using an HTTP-proxy agent. Yet in addition, disclosed is the method wherein the data relating to user activity comprises purchase amounts, purchased item identification, travel dates, e-mail addresses, or zip codes. Yet additionally further disclosed is the method further comprising the step of revising the instructions on how to select and extract information from the text page to create selection parameters based on analysis of parameter data sets. Yet further also disclosed is the method further including step of generating a report on the analysis of parameter data sets. Yet further in addition disclosed is the method further including repeating steps (a) through (e). Also further additionally disclosed is the method wherein the user activity comprises an activity selected from the group consisting of purchases of goods and/or services, online shopping cart abandonment, credit card type usage, user account creation, and contest participation.

D. A system for continuous event monitoring over a distributed computer network, comprising a server for detection, identification and analysis of a plurality of events, the server having: (a) a memory for storing records, and (b) a processor operatively connected to the memory, the memory storing instructions for rewriting an original URL as a proxy URL in order to cause a browser to send a request to the server, wherein when the browser sends the request to the server, the server sends a server request to the original URL, receives a response and serves the response to the browser while collecting data. Also disclosed is the wherein the original URL comprises a request protocol, a hostname, a port number and a path.

E. A computer-readable medium whose contents cause a distributed computer network to track user activity, the distributed computer network having client computers connected to servers, by performing the steps of: (a) capturing data relating to user activity in a central database; (b) extracting relevant data from the database based upon user profiles; (c) maintaining the profiles based upon instructions on how to identify information from a Web page; and (d) analyzing the relevant data to predict future user activity.

F. A system for tracking user activity in a distributed computer network, comprising: (a) means for capturing data relating to user activity in a central database; (b) means for extracting relevant data from the database based upon profiles; (c) means for maintaining the profiles based upon instructions on how to identify information from a text page; and (d) means for analyzing the relevant data to predict future user activity. Also disclosed is the system wherein the means for capturing data relating to user activity is a server. Further disclosed is the system wherein the distributed computer network comprises a plurality of clients and servers. Additionally disclosed is the system wherein the system further comprises a means for generating reports comprising results of the analysis of the relevant data.

G. A method for tracking and reporting user activity across a distributed network comprising a plurality of clients and one or more servers, the method comprising the steps of: (a) capturing at least one HTTP transmission record between at least one browser on a client and at least one Web site on a server; (b) analyzing each of said recorded HTTP transmissions to determine an identity for the transmission based on user-defined parameters; (c) extracting attribute data from each of said identified Web pages based on user-defined parameters; (d) detecting an occurrence of an event; (e) composing attributes of the event from attributes extracted from at least one HTTP transmission record; (f) generating a report relating to data resulting from the capture, identification, attribute data extraction and analysis of the HTTP transmission records; (g) comparing statistical information contained in the report to predefined thresholds; and (h) responding when said thresholds are not met. Also disclosed is the method wherein, in the event that thresholds are not met, the method comprises the further steps of: (i) determining if user-defined parameters require amendment; (j) amending the user-defined parameters; and (k) validating the amended parameters against recorded HTTP transmissions.

H. A method for assisting in tracking and reporting online activity across a distributed network comprising a plurality of clients and one or more servers, the method comprising the steps of: (a) creating, amending and validating user-defined parameters to assist in the identification of HTTP transmission records; (b) creating, amending and validating user-defined parameters to assist in the extraction of attribute data from identified HTTP transmission records; (c) determining if user-defined parameters to assist in the identification of HTTP transmission records require amendment; (d) determining if user-defined parameters to assist in the extraction of attribute data from identified HTTP transmission records require amendment; and (e) generating reports when amendments to user-defined parameters are made. Also disclosed is the comprising the further step of recording an HTTP transmission stream for creating, amending or validating user-defined parameters for use in the identification of HTTP transmission records. Further disclosed is the method comprising the further step of extracting attribute data from identified HTTP transmission records. Additionally disclosed is the method wherein one or more mirror systems are established for the creation, amendment and validation of user-defined parameters for the identification, attribute data extraction, and analysis of HTTP transmissions. Yet also disclosed is the method further comprising a step of synchronizing user-defined parameters between the mirror systems. Yet further disclosed is the method further comprising a step of transferring HTTP transmission records to the one or more mirror systems for the purpose of creating, amending or validating user-defined parameters for use in the identification of HTTP transmission records or extraction of attribute data from identified HTTP transmission records.

These and other features and advantages of the invention will be apparent to those skilled in the art from the following detailed description of the preferred embodiments taken together with the accompanying drawings.

DETAILED DESCRIPTION OF PREFERRED EMBODIMENTS

The system and method of the present invention effectively reports on many different types of known online activity and data including but not limited to: purchases from the sale of goods and services online, online shopping cart abandonment, airline ticket reservations, credit card type usage, user account creation, and contest or sweepstake entries. The present invention provides event specific attributes such as purchase amounts, cart item names, travel dates, e-mail addresses and zip codes. Traditional types of online activity data such as page view counts and session durations that are currently reported by existing prior art systems are likewise provided.

Figure 1:
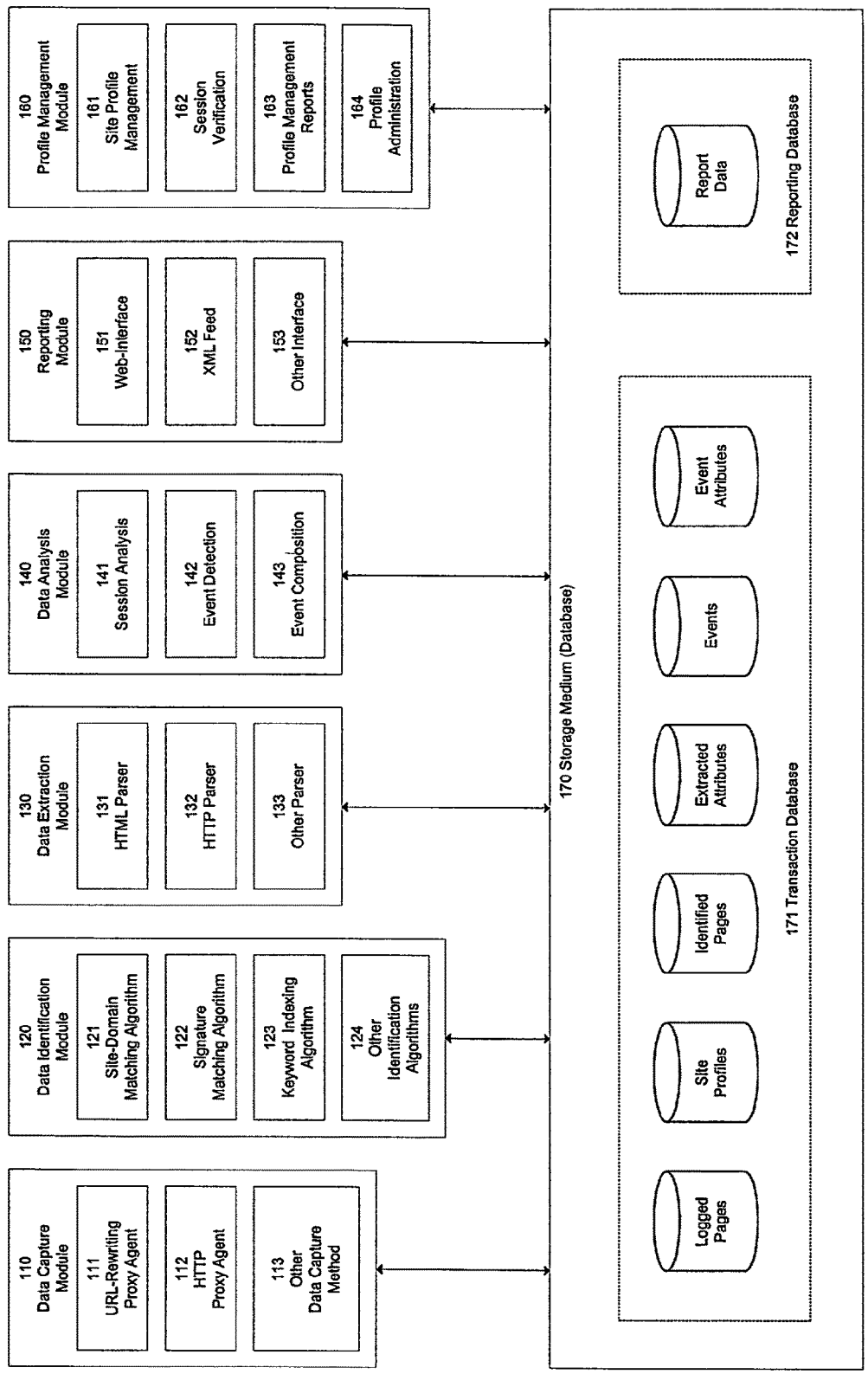
FIG. 1 is a schematic diagram depicting the event tracking system application architecture according to the present invention.

According to a preferred embodiment of the present invention, ETS employs a modular application architecture in which major software components are delineated across discrete functions. The modular architecture allows for the introduction of new functionality without imposing a great development burden. It also allows for interchanging different modules, thus adding to the flexibility of the system. FIG. 1 is a schematic diagram depicting the Event Tracking System (ETS) application architecture according to an embodiment of the present invention. The application architecture 100 comprises a data capture module 110, an identification module 120, an extraction module 130, an analysis module 140, a reporting module 150, a profile management module 160 and a storage medium 170.

According to the application architecture of the present invention, the data capture module 110 traps client-server HTTP transmissions and records them on a storage device. The data capture module is responsible for: providing a means by which it can intercept client-server HTTP transmissions; decrypting SSL encrypted transmissions when applicable; recording the entire, non-encrypted HTTP request and response on a storage device; and recording other data related to the transmission, such as the identity of the requesting client, the URL for the request, and the time at which the transmission occurred.

In its preferred embodiment, the data capture module is implemented as a URL-rewriting proxy agent 111. Existing prior-art systems employ URL-rewriting proxy agents (hereinafter "URL-proxy") to anonymize the identities of browsers from the target Web site. Other prior-art systems employ URL-proxies to create secure virtual private networks that allow external browsers access to selected Web sites within a corporate entity's internal network. The system and method of the present invention employs URL-proxies to capture client-server transmissions for the purpose of reporting online activity.

URLs, as they are generally used in the worldwide Web, are formatted to contain four pieces of information: the request protocol, the hostname or Domain Name Server (DNS) address of the server site, an optional port number, and a path. In the case of the Web, the protocol is always HTTP or HTTPS. At this point, it should be noted that HTTPS is the HTTP protocol served over SSL. If a port number is not specified, it is assumed to be port 80 for HTTP or port 443 for HTTPS. The path typically points to a specific resource at the specified host, and may contain optional parameters. The URL-proxy works by rewriting URLs such that the original URL is encoded as part of the path of the proxy URL.

The rewritten URL causes the browser to send a request to URL-proxy. The proxy then extracts the original URL from the path of the rewritten URL, sends a request to the original host, receives the response from the original host and serves the response data to the browser. If the response data is in the form of HTML code, the URL-proxy first rewrites all URLs embedded in the HTML code in the manner described above before sending the response back to the browser. In this manner, the URL-proxy is able to intercept further requests initiated by the browser as a result of the user clicking on hyperlinks that reference the rewritten URLs.

According to an embodiment of the system and method of the present invention, the URL-proxy rewrites selected URLs within the HTML code that reference image files such that they refer directly to the original resource. Image files typically do not contain valuable information regarding events, and thus need not be intercepted by the proxy agent.

Secure HTTP transmissions over SSL are treated in the same manner as regular HTTP transmissions, provided that the URL-proxy first decrypts the server response. This enables the proxy agent to rewrite URLs embedded in the HTML code. Decryption is also required by ETS in general to detect events and extract event attributes from the transmission. The URL-proxy can then re-encrypt the response before sending it back to the browser.

The URL-proxy is a preferred data capture mechanism for situations in which an entity that refers users to a site has a need to track the activity of the referred users on the site. To accomplish this, the tracking entity need only to rewrite the initial URL for the site to initiate the URL-proxy into the referred user's browsing stream. One example is a portal site that has a directory of online merchants. The portal site can choose to rewrite the URLs on the directory such that users that activate the URLs are directed through the URL-proxy. Another example is an e-mail based marketing campaign that promotes specific products on a merchant site by providing the URLs to the product pages. The marketer can track the effectiveness of the campaign by rewriting the product URLs to direct users through the URL-proxy.

In its preferred embodiment, the URL-proxy records referral parameters along with the HTTP-transmission by encoding the parameters within the rewritten URL. Referral parameters are user-defined parameters that may be used to logically group and query report data. The URL-proxy preferably records and associates the following referral parameter with an HTTP transmission: a referral site, a source code, and a category code.

As a variant to the preferred embodiment of the data capture module, an HTTP proxy agent 112 is implemented. Existing prior-art systems make use of HTTP proxy agents (hereinafter, "HTTP-proxy") to cache Web resources in order to improve download times. Other prior-art systems employ HTTP-proxies to restrict external Web access from within a private network, such as a corporate LAN. The aforementioned prior-art systems, as well as the present invention, implement an HTTP-proxy in a manner consistent with codified HTTP standards established by the Internet Engineering Task Force (IETF), and with de-facto industry standards established by the major browsers.

The HTTP standards provide a tunneling protocol in which the proxy creates a tunneled connection between the browser and the Web site for secure communications. While the proxy can freely record transmissions that flow through the tunnel, it never has cause to do so because the information is decipherable only to the browser and the Web site.

SSL is an end-to-end encryption protocol wherein the browser and the Web site securely negotiate encryption keys through the SSL handshake protocol. In addition to exchanging encryption keys, browsers may request an SSL server certificate from the Web site to authenticate the server. The server certificate binds a hostname with the server's private key used in the SSL handshake protocol. Standard HTTP-proxies are never privy to the information passing through an encrypted tunnel because they do not possess the private key bound to the server hostname according to the server certificate received by the browser.

It should be noted that upon presentation, the browser also authenticates the server certificate against its own list of trusted root certificate authorities. The two major browsers in the market, Netscape Navigator™ (NN) and MicroSoft Internet Explorer™, (MSIE) have a default list of trusted root certificate authorities that are activated upon installation of the software. One such trusted root certificate authority (CA) is VeriSign®. However, both browsers allow for the installation of additional trusted root CA's on each instance of the software.

It follows from the above description that a trusted root CA is privy to SSL-encrypted transmissions. An HTTP-proxy operated by an entity with root CA status on a browser can issue SSL-server certificates that are verifiable to the browser. Upon the root CA's discretion, SSL-server certificates can bind any hostname to any private key. In this particular case, the root CA can issue SSL-server certificates that bind hostnames of proxied Web sites to a private key that is known to the HTTP-proxy. In this way, the HTTP-proxy is able to successfully conduct an SSL-handshake with browsers and gain access to SSL encrypted information.

Figure 2:
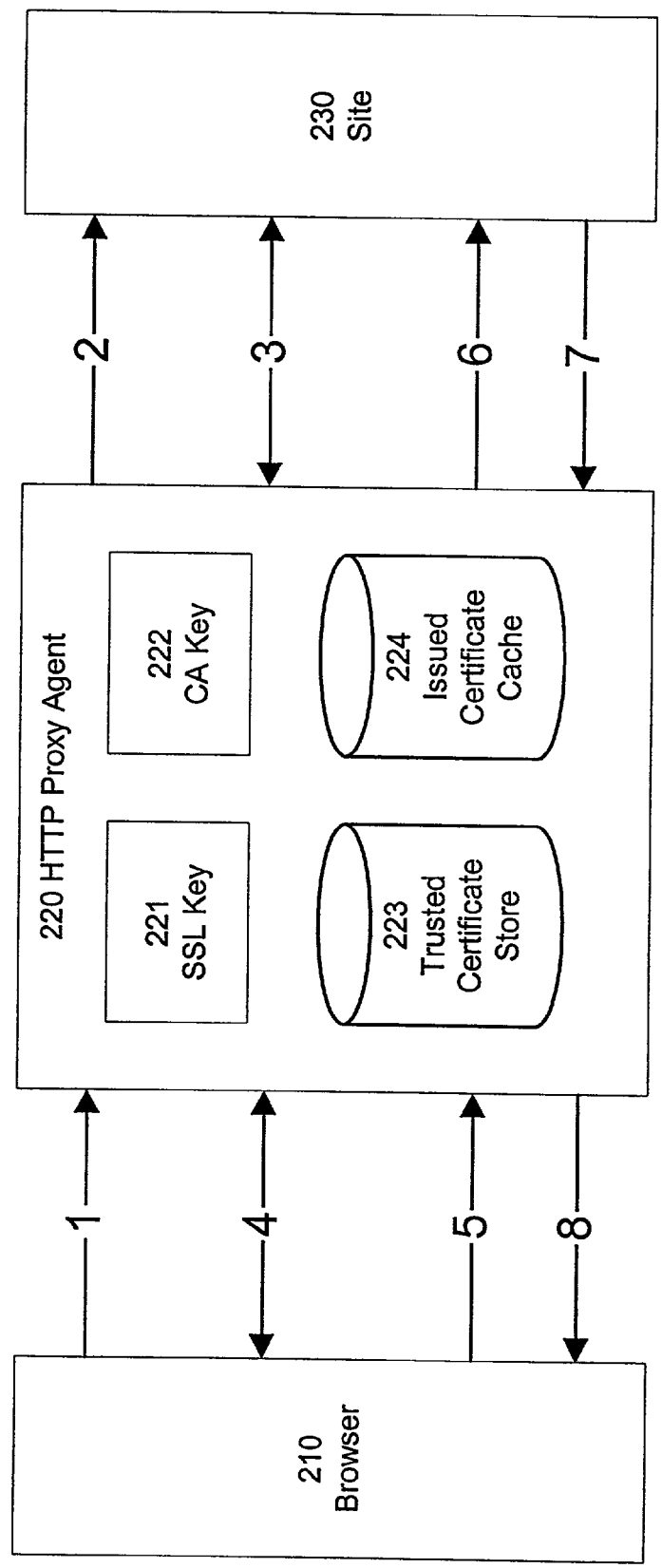
FIG. 2 is a schematic diagram depicting the modified SSL workflow for an HTTP-proxy according to the present invention.

FIG. 2 is a schematic diagram depicting the modified SSL workflow for an HTTP-proxy according to the present invention. It shows three transacting entities: the client browser 210, a modified HTTP-proxy 220 and a Web site 230. Additionally, the diagram illustrates sub-components of the HTTP-proxy. The SSL-key 221 is for SSL-handshake negotiation with the browser. The CA-key 222 is for signing SSL-certificates issued by the HTTP-proxy. The trusted certificate store 223 contains a list of trusted certificates used to validate SSL-handshakes negotiated with Web sites. The certificate cache 224 stores certificates issued by the HTTP-proxy.

The Table below provides a description of the logical workflow illustrating the functioning of an embodiment of the present invention in an SSL environment.

TABLE 1

1. The browser 210 opens a connection and sends a 'CONNECT' request to the HTTP-proxy 220.
2. The HTTP-proxy opens a connection with the Web site on port 443. Under existing prior-art systems, the HTTP-proxy would create a tunnel by joining the browser-bound connection with the site-bound connection. Thereafter, the browser and the site would conduct the SSL-handshake without any intervention on behalf of the proxy.
3. The HTTP-proxy and the Web site conduct an SSL-handshake with the HTTP-proxy acting as the client. At this point, the HTTP-proxy receives an SSL site certificate from the site. The proxy validates this certificate against its trusted certificate store (223). Upon validation, the proxy checks the certificate cache (224) to see if it has already issued an SSL server certificate (hereinafter, 'proxied server certificate') for the site. If not, the HTTP-proxy issues a proxied server certificate by binding the proxy's SSL-key (221) with the site hostname. The certificate is signed by the proxy's CA-key (222) and recorded on the certificate cache.

TABLE 1-continued

4. The HTTP-proxy negotiates a separate SSL-handshake with the browser using its SSL-key. The proxy also presents the proxied server certificate to the browser for validation. The browser will validate the proxied certificate so long as the proxy CA-key is certified by a root CA trusted by the browser.
5. The browser subsequently sends SSL-encrypted HTTP requests to the proxy as if it were the site.
6. The proxy forwards the same HTTP request to the site through its own SSL-encrypted connection.
7. The proxy receives the response, decrypts it and records the entire transmission (request and response) onto a persistent storage medium.
8. The proxy sends the response to the browser, re-encrypted for the browser-bound SSL connection.

Thus, an HTTP-proxy is modified to decrypt and record SSL-encrypted transmissions for any browser that validates the proxy CA-key. In its preferred embodiment, the system and method of the present invention enables a browser for HTTP-proxy based tracking by executing an installation script on the client computer that installs a trusted root CA certificate on the browser.

As a variant of the preferred embodiment, the step to install the trusted root CA certificate may be omitted through the issuance of a sub-CA certificate by an already trusted root CA such as VeriSign®.

In its preferred embodiment, the certificate installation script is amended to configure the browser to use an HTTP-proxy. Standards compliant browsers such as NN and MSIE provide a means to configure the browser to send requests through an HTTP-proxy. The aforementioned installation script modifies the browser configuration and specifies a Proxy Automated Configuration (PAC) script-URL. The PAC script is JavaScript code that resides in a central server and accessible via the specified PAC URL. The browser retrieves the PAC script when it is launched by the operating system. PAC scripts allow for central administration of several browsers because they eliminate the need for each browser to be individually administered. Although PAC scripts and PAC URLs are not directly specified in the HTTP standards, both NN and MSIE support this feature.

Before a browser requests a given URL, it consults the PAC script as to which HTTP-proxy it should use. The PAC script inspects the URL and instructs the browser either to use one or more HTTP-proxies, or to bypass all proxies and send the request directly to the site. In its preferred embodiment, the PAC script is coded in such a way that image files, audio files and other resources irrelevant to the tracking and reporting of an event-insofar as their nature is apparent in the URL passed to the PAC script-bypass the HTTP-proxy. This provision greatly reduces the bandwidth, storage and processing requirements for the data capture module.

As a variant of the preferred embodiment, the PAC script may be coded to only direct HTTPS requests through the HTTP-proxy. Such a provision would greatly reduce the bandwidth, storage and processing requirements for the system. While some industry estimates place SSL traffic to only around 2% of the total Web traffic, SSL-encrypted pages are rife with transaction data. For certain applications, losing the ability to track and report events on non-encrypted pages may be worthwhile in exchange for a much lower cost of operation.

As another variant of the preferred embodiment, the step to configure the browser to use a PAC script may be omitted-if the browser(s) to be tracked are within a private network and the entity that tracks online activity has jurisdiction over the same network-by modifying the network configuration such that all HTTP and HTTPS traffic occurring on ports 80 and 443, are funneled to an HTTP-proxy as described above. Corporate entities operating a LAN, or Internet Service Providers are examples of entities that may implement this variant of the preferred embodiment.

As a variant of the preferred embodiment of the data capture module, data encryption may be applied to HTTP transmissions before recording them on a storage device, particularly when such transmissions occur over SSL. Such provisions may be necessary for security-sensitive applications of the present invention.

As another variant of the preferred embodiment of the data capture module, data compression may be applied to HTTP transmissions before recording them on a storage device. Such provisions greatly reduce the amount of hard disk memory required to store client-server transmissions.

In summation, ETS makes use of an URL-proxy or an HTTP-proxy for capturing real-time HTTP transmissions. However, ETS can also operate in batch mode and process HTTP transmissions that have been archived by either of the proxies mentioned above or by some other recording mechanism.

According to the system and method of the present invention, an individual HTTP transmission record undergoes two processing phases: data identification and data extraction. Referring back to FIG. 1, the identification module 120 implements several algorithms for the purpose of identifying a record, whereas the data extraction module 130 implements several algorithms for the purpose of extracting data from a record.

Figure 3:
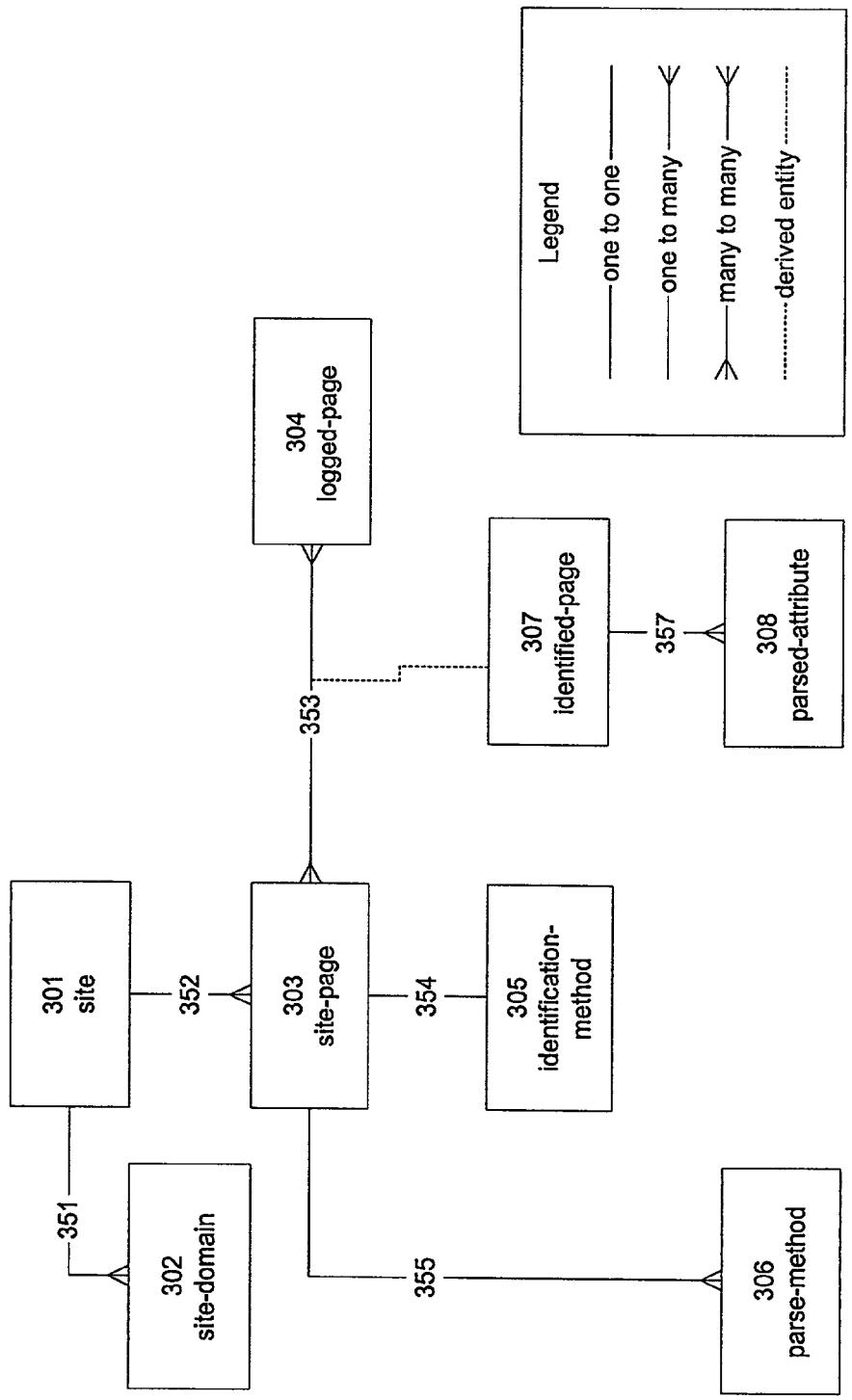
FIG. 3 is a schematic diagram of the major processing entities for data identification and extraction according to the present invention.

Consider now FIG. 3, which is a schematic diagram of the major processing entities for data identification and extraction according to the present invention. A site object 301 represents a Web site for which an embodiment of the present invention tracks and reports online activity. A site-domain object 302 represents a domain under which a site is hosted. A single site may be hosted on multiple site-domains, as expressed in the relationship 351. A site-page object 303 represents a type of page that is found within a site, for example, a cart checkout page. In general, a site-page is any page that contains event-related information or expresses the occurrence of an event. A single site can have multiple site-pages, as expressed by relationship 352. A logged-page object 304 represents an individual HTTP transmission record. An identification-method object 305 represents an algorithm for matching a site-page with a logged-page. A site-page can have only one identification-method, as expressed by relationship 354. An identified-page object 307 represents a logged-page that has been matched to a site-page according to the site-page's identification-method. It should be noted that a site-page may identify multiple logged-pages, whereas an individual logged-page may be identified by at most one site-page, as expressed by relationship 353. A parse-method object 306 represents an algorithm and algorithm parameters for extracting attributes from a logged-page record. A site-page may have multiple parse-methods, as expressed by relationship b. A parse-attribute object 308 represents the set of attributes that result from the application of a parse-method to an identified-page record. It should be noted that multiple parse-attributes may result from the single application of a parse-method. Furthermore, multiple parse-methods may be applied to an identified-page. A single identified-page may have multiple parse-attributes, as expressed by relationship 357.

The following Table provides a pseudo-code description of the identification process according to an embodiment of the present invention.

TABLE 2

```
For each unprocessed logged-page record
    Extract the URL from the request portion of the record
    Extract the hostname from the URL
    Apply the site-domain matching algorithm
    If the site-domain matching algorithm finds a match
    then
        Mark the logged-page record as belonging to the matching site.
        Retrieve all site-page records for the matching site.
        For each site-page
            Determine the identification-method for the site-page
            If the algorithm is the signature-matching algorithm
            then
                Apply the signature-matching algorithm to the
                logged-page record
            else if the algorithm is the keyword-indexing algorithm
            then
                Apply the keyword-indexing algorithm to the
                logged-page record
            end if
            If the identification-method finds a match
                Create an identified-page record;
            end if
        end for each
    else
        Mark the logged-page record as belonging to an unknown site.
    end if
end for each
```

The three algorithms referenced in the preceding pseudo-code description of identification processing merit additional discussion. Referring back to FIG. 1, the site-domain matching algorithm 121 is used to determine the server site for each logged-page record. The algorithm starts with a list of user-defined site-domain records. Site-domains records consist of a domain string and a site identifier. The domain string can take one of two forms: relative domain strings and exact domain strings. Relative domain strings are prefixed by the dot ('.') symbol, whereas exact domain strings are not. An exact domain string matches a host name if the hostname and the domain string are identical. A relative domain string matches a hostname if the hostname ends with a string of characters that are identical to the relative domain string. If a hostname matches with multiple site-domain records, preference is given to the record with an exact domain string. If a hostname matches with multiple records, all of which have relative domain strings, preference is given to the record with the shortest matching relative domain string.

According to the application architecture of an embodiment of the present invention, and referring to FIG. 1, the data identification module 120 is shown to employ the signature-matching algorithm 122 and keyword-indexing algorithm 123 as distinct identification-method algorithms, with provisions to accommodate yet other algorithms for identifying site-pages as the need and design for such algorithms become apparent.

The signature-matching algorithm 122 is a type of identification-method that matches logged-page records of a known site with the site-pages for the site. A signature is an ordered set of strands, which are user-defined strings that uniquely identify a site-page. A signature matches a logged-page if all of its strands are found embedded within the logged-page and in the proper sequence.

The keyword-indexing algorithm 123 is another type of identification-method that matches logged-page records of a known site with the site-pages for the site. The algorithm starts with a list of keywords, which are strings associated with a threshold value. The algorithm matches a logged-page if all the keywords strings are found embedded within the logged-page, and the frequency of occurrence for each keyword string exceeds its associated threshold value.

Once a logged-page record has been identified, event attribute data may be extracted from the content of the identified-page by applying one or more user-defined parse-methods associated with the matching site-page. A parse-method expresses the type of algorithm and any algorithm-specific parameters to be used for extracting attribute data from an identified-page record.

According to the application architecture of an embodiment of the present invention, and referring back to FIG. 1, the data extraction module 130 employs an HTML-parser 131 and an HTTP-parser 132 as distinct parse-method algorithms, with provisions to accommodate yet other algorithms for extracting attribute data as the need and design for such algorithms become apparent.

The preferred result of applying a parse-method to an identified-page is a list of parse-attribute records, with each record containing the name of the attribute, the value of the attribute as extracted from the content of the identified-page, and the data type of the attribute. The application architecture of the present invention preferably supports the following attribute data types: null, integer, boolean, character, string, float, money, date-time and nested, with provisions to accommodate yet other attribute data types as the need becomes apparent. The null, integer, boolean, character, string, float, money and date-time data-types are basic data-types used to express the nature of an attribute and data-type-specific operations that may be applied to the attribute. The nested data-type is preferably used to express complex data constructs, such as composite data-types that combine two or more basic data-types, or arrays of either basic or composite data-types.

According to the application architecture of an embodiment of the present invention, and referring to FIG. 1, the data analysis module 140 consists of three components responsible for session analysis 141, event detection 142 and event composition 143.

Figure 4:
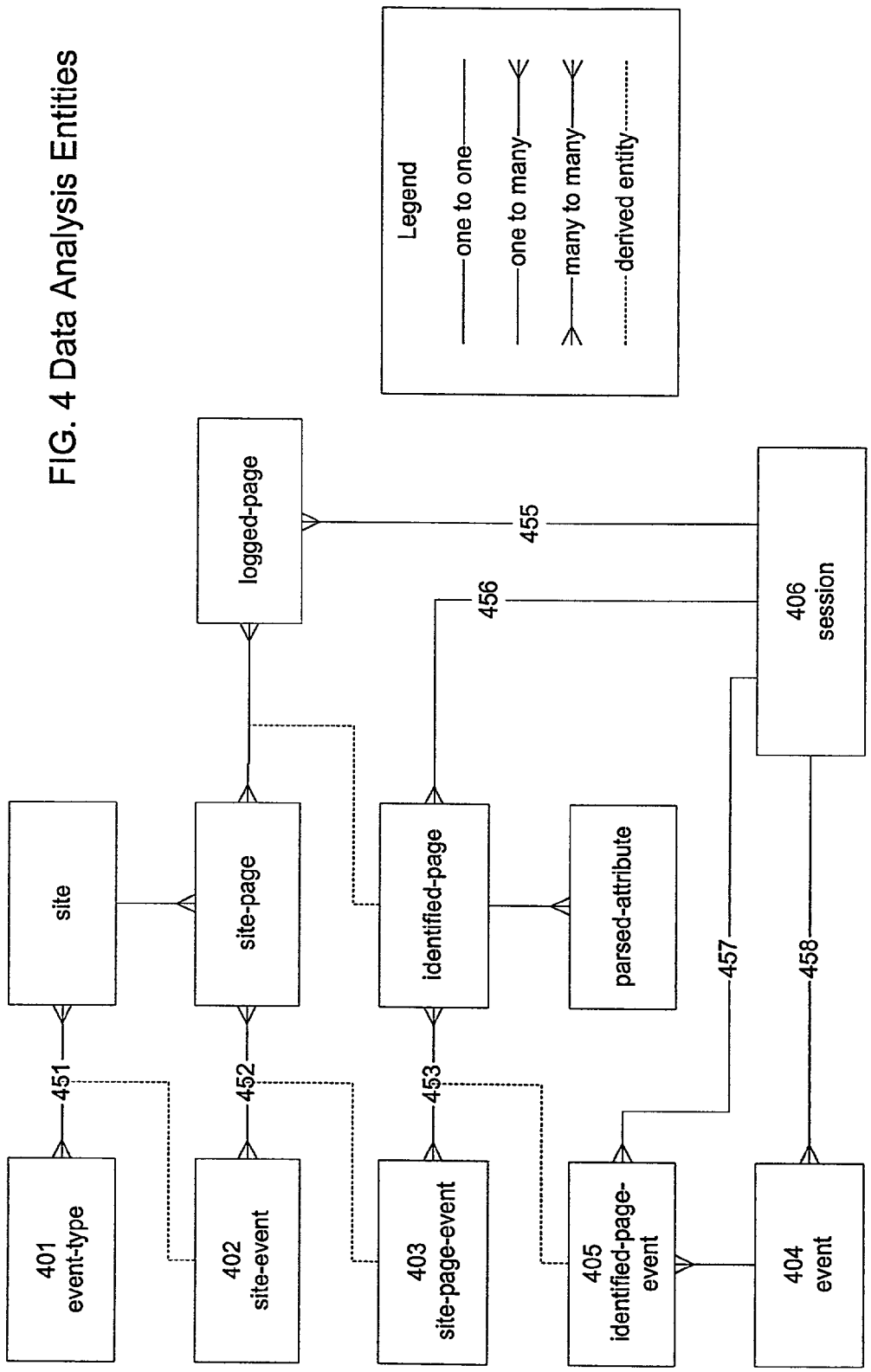
FIG. 4 is a schematic diagram of the major processing entities for data analysis according to the present invention.

Consider now FIG. 4, which is a schematic diagram of the major processing entities for data analysis according to the system and method of the present invention. An event-type object 401 represents a type of event, such as an e-commerce purchase. A site-event object 402 represents the set of event-types that may be detected in a site. The same event-type may be detected on multiple sites, and each site may have multiple detectable event-types, as expressed in the relationship 451. A site-page-event object 403 represents the set of site-events associated with a site-page. A single site-page may associate with multiple site-events, as expressed in the relationship 452. For example, an e-commerce checkout page may also serve as a user-registration page. An identified-page-event object 405 is the set of site-page-events for an identified-page. Recall that identified-pages are matched by a site-page. An identified-pageevent record is created for each site-event associated with a site-page that matches an identified-page. Since there may be multiple site-events per site-page, it follows that there are multiple site-page-events associated with an identified-page, as expressed in the relationship 453. An event object 404 represents a detected event, created as a result of event detection applied to identified-page-events. A session object 406 is a grouping of logged-pages by browser and log date. There may be multiple logged-pages per session, as expressed in the relationship 455. Consequently, since identified-pages and identified-page-events, are derived from logged-pages, it follows that are may be multiple of these objects per session, as expressed in the relationships 456 and 457. Multiple events may also be detected in the same session, as expressed in the relationship 458.

According to an embodiment of the system and method of the present invention, the session analysis algorithm groups logged-pages by browser and log date. The session analysis algorithm groups consecutive logged-pages from the same browser under the same session if the elapsed time between logged-pages are within 30 minutes of each other. An elapsed time of 30 minutes is an arbitrary measure of session-expiration. However, most Web sites implement automated log-outs after 30 minutes of browser inactivity. The session analysis algorithm is preferably applied in real-time as logged-pages are recorded onto the storage device. As an alternative to a preferred embodiment, the session algorithm may be applied in batch mode.

The following Table provides a pseudo-code description of the real-time session analysis algorithm according to the present invention.

TABLE 3

For each logged-page to be recorded:
    Identify the browser of the current logged-page record
    Retrieve the session and log time of the last logged-page recorded for the browser
    Assign said session to the current session
    If the current time is more than 30 minutes past the said log time then
        expire the current session
        create a new session
        record the current logged-page and associate it with the new session TABLE 3-continued else
        record the current logged-page and associate it with the current session
    end if
end for each According to an embodiment of the system and method of the present invention, the event detection algorithm is applied to logged-pages grouped by session. In its more preferred embodiment, the event detection algorithm is implemented by a software program scheduled to run periodically at regular time intervals. Event detection analyzes identified-page-event records, and therefore can only process sessions after the identification and extraction algorithms have been applied to all logged-page records within the session. Specifically, event detection inspects the event-sequence-code field of the identified-page-records. The event-sequence-code field is a user-defined parameter of the site-page-event record. The identified-page-event record inherits this field when a site-page matches with a logged-page, resulting in the creation of identified-page and identified-page-event records.

There are two significant types of event-sequence-codes: P and T. All other values for the field are ignored. A site-page-event with an event-sequence-code of T is a trigger page. A trigger page is a site-page that signifies the occurrence of an event. For example, with an e-commerce purchase, the order confirmation page is considered to be the trigger page for a purchase event. A site-page-event with an event-sequence-code of P is a pre-trigger page. Pre-trigger pages are used to prevent false-positive results arising from browser refresh.

The majority of transactions that occur over the Web employ a paradigm where the user submits a request to execute a transaction, and the Web site responds with a page confirming the execution of the transaction. However, refreshing causes a browser to re-submit the previous request, possibly causing the Web site to execute the transaction twice. Most sites now use HTTP redirects to prevent double execution of a transaction. When a site receives a request to execute a transaction, it responds with a redirect code. The redirect code causes the browser to automatically send a second request, this time retrieving the transaction confirmation page. Pre-trigger pages are meant to model the redirect code. If a pre-trigger page is defined for a site-event, then the detection of a trigger page will create an event only if it is immediately preceded by a pre-trigger page.

The following Table provides a pseudo-code description of the event detection algorithm according to an embodiment of the present invention.

TABLE 4

For each unprocessed, expired session:
    If there are no unprocessed logged-pages for the session
    and there are no identified-pages to be parsed for this session
    then
        Retrieve all site-events associated with an identified-page-event record for this session
        For each site-event:
            Apply site-event function described below.
        end for each
    end if
end for each
Begin site-event function:
    Retrieve all identified-page-events for this site-event and session, ordered by latest log time
    For each identified-page-event record:
        If the event-sequence-code is T then
            If the a pre-trigger is defined for this site-event and
            the event-sequence-code of the next record is not P

TABLE 4-continued

```
        then
            Continue to the next identified-page-event record.
        end if
        Associate the new event with the current identified-page-event record.
        Associate the new event with the rest of the identified-page-event records
            Up until the next trigger-page, or until no records are left.
        If there are records left then
            Continue to the next identified-page-event record
        end if
      end if
    end
End site-event function.
```

According to the system and method of the present invention, the event composition algorithm is applied following the detection of an event. Each Web site has a different method of expressing event attributes, and the attributes are typically found across a series of pages. For example, a site on which an online purchase is transacted might show item information on a cart page, purchase sub-total and tax information on a separate order summary page, and the purchase total on the confirmation page. In a preferred embodiment, the event composition algorithm retrieves all attributes across all pages associated with an event, and composes the event attributes by taking the values of the latest occurring parse-attribute per attribute-type.

Figure 5:
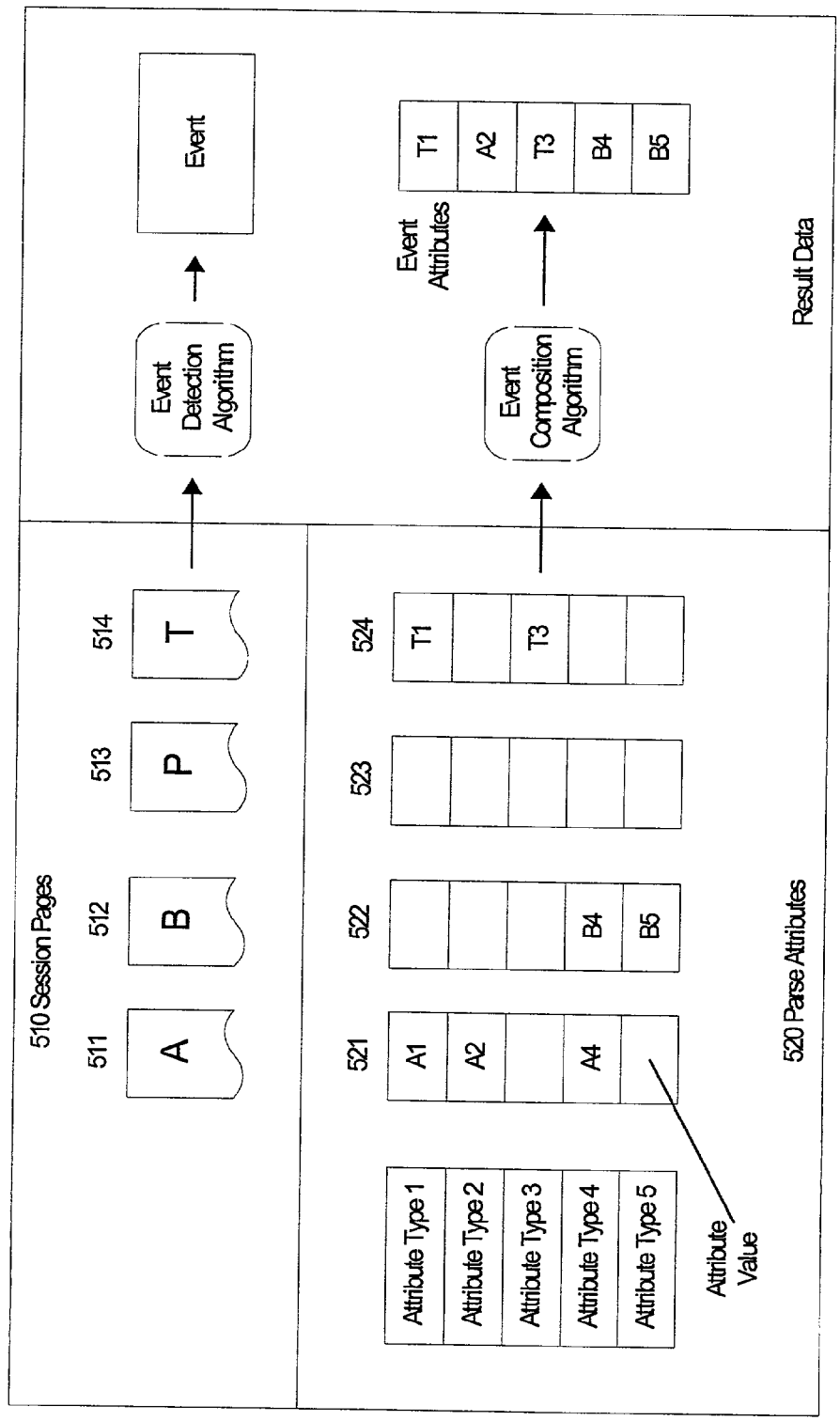
FIG. 5 is a schematic diagram illustrating the event composition algorithm according to the present invention.

Consider now FIG. 5, which is a schematic diagram illustrating the event composition algorithm according to an embodiment of the present invention. A session 510 is shown to contain identified-page-events 511, 512, 513 and 514, with event-sequence codes of A, B, P and T respectively. The event detection algorithm 530 is shown to have detected a trigger page 514 immediately preceded by a pre-trigger page 513 and subsequently has created an event 540. Parse-attributes 521, 522 and 524 have been extracted from the page records. The diagram shows five attribute-types, represented by a slot in each parse-attribute list. Note that the pre-trigger page, which maps to an HTTP redirect, has no content and therefore has no parse-attributes as shown by 523. The event composition algorithm 550 traverses the parse-attributes in reverse order. As shown by the diagram, the event-attributes 560 are composed of attributes associated with pages 511, 512 and 514, where the attribute values are derived from the latest available value by log date.

The following Table provides a pseudo-code description of the event composition algorithm according to the present invention.

TABLE 5

```
Retrieve the identified-page-event records associated with the event
ordered by latest log date
For each identified-page-event record:
    Retrieve all parse-attribute records associated with the identified-
        page-event
    For each parse-attribute record
        Check if an event-attribute exists for the current event that has
the same attribute-type
        If an event-attribute is not found
        Then
            Create an event-attribute record for the event where
                the event-attribute value and type are the same as
the parse-attribute value and type
        End if
    End for each
End for each
```

According to the application architecture of the present invention, and referring back to FIG. 1, the reporting module 150 is composed of at least two interfaces, a Web-based interface 151 and an XML feed 152 that report online activity in a particular format. The Web-based interface is an interactive graphical user interface that returns report query results in HTML format. The XML feed is an interface that returns report query results in XML format. In a preferred embodiment, the Web-interfaces employ permissions-based access control, wherein authorized users are authenticated with by a user name and password combination. The reporting interfaces preferably provide access to five major reports: a session detail report, an event detail report, a purchase detail report and a purchase summary report.

In a preferred embodiment, the session detail report is queried by activity start and end dates and by site name. It returns the following fields per session record that matches the query: the session identifier, the time at which the session was created, the number of page views in the session, the number of purchase events detected in the session, the number of total events detected in the session, the session duration and a user identifier.

In a preferred embodiment, the event detail report is queried by activity start and end dates and by site name. It returns the following fields per event record that matches the query: the session in which the event was detected, the time of the event, the site of the event, the event type, and a user identifier.

In a preferred embodiment, the purchase detail report is queried by activity start and end dates and by site name. It returns the following fields per purchase item record that matches the query: the purchase date, the time at which the purchase occurred, the site of the purchase, the name of the purchased item, the unit price of the item, the quantity, the total price, a user identifier, and the credit-card type.

As a variant to the preferred embodiments, the session detail, event detail and purchase detail reports may also be queried by the category code and source code referral parameters for sessions that have been recorded by a URL-rewriting proxy agent. They return the following additional fields per record that matches the query: the referral site, the category code and the source code.

In a preferred embodiment, the purchase summary report is queried by activity start and end dates and by site name. It returns the following fields per site record that matches the query: the site name, the total number of purchases on the site, the total number of items purchased on the site, the total value of purchases on the site, the total number of page views on the site, the total duration of all session within the site. As a variant to the preferred embodiment, the purchase summary report may return the category code and source code referral parameters for sessions that have been recorded by a URL-rewriting proxy agent.

According to the application architecture of an embodiment of the present invention, the storage medium 170 stores logged-page records, user-defined parameters for identification and extraction (hereinafter, "site profiles"), extracted parse-attributes, event data and report data. In its preferred embodiment, the storage medium is implemented as two logically separate databases-a transactional database for storing logged-page records, site profiles and transaction processing elements, and a reporting database for storing report data. According to an embodiment of the system and method of the present invention, the reporting database is populated by a SOL script scheduled to run on a nightly basis. The data on the reporting database may be refreshed any time should re-processing of logged-page data become necessary, as when site profiles are amended.

According to the application architecture of an embodiment of the present invention, and referring back to FIG. 1, the profile management module 160 has four components: site management 161, session verification 162, profile reports 163, and administration 164. In its preferred embodiment, the profile management module has a web-based graphical user interface (GUI), and its four components are sections that may be accessed from the GUI main menu.

The site management section provides interfaces for creating, amending and deleting sites, site-domains, site-pages, event-types, attributes, identification-methods and parse-methods. It also provides interfaces to view and retrieve various objects, and associate objects with one another. The session verification section provides interfaces for creating sessions and logged-pages for existing sites, viewing an existing session, viewing individual logged-page records within a session, viewing identified logged-pages in a session, and viewing extracted attributes associated with an identified-page. The session verification section also provides interfaces for resetting the session for data identification, extraction and analysis. The profile reports section provides a summary view of profile, session, logged-page and event data to assist in the profile management process. It also provides access to application error logs.

Access to the administration section is restricted to authorized personnel. It provides interfaces for: profile user management, event and attribute creation, data purge, data reset and a job manager. Access is restricted to high-level profile administrators. Profile user management interface provides profile user creation, deletion and modification functions. The event and attribute creation interface provides event-type and attribute-type creation, as well as event to attribute association functions. The data purge interface allows the administrator to purge logged-pages and other data based on a date range. The data reset interface allows the administrator to reset status codes on session, logged-page and identified-page records to re-process said records for data identification, extraction and analysis. The reset interface also allows the administrator to re-generate data on reporting database for a specified date range. The job-manager interface allows the administrator to start, stop and view daemon jobs that execute the data identification, extraction and analysis algorithms, as well as the nightly report generation script.

According to an embodiment of the system and method of the present invention, mirror event tracking systems are deployed for the purposes of profile creation and live traffic analysis. Hereafter, these are respectively referred to as the profiling system and the production system. The profiling system is where site profiles are created, amended and validated. Site profiles are the user-defined parameters used by the identification, extraction and analysis modules to: identify the site for a logged-page record; associate logged-page records with site-pages; associate site-pages with event triggers, event pre-triggers, and parse-methods. Site profiles are preferably created, amended and validate by profilers, which are authorized users that create, amend and validate profiles using a graphical user interface. Profilers are also authorized to synchronize site profile records between the profiling system and the production system.

The following Table provides is an outline description of the profile creation process as performed by a profiler, according to an embodiment of the present invention:

TABLE 6

1. Create a site record.
   1.1. Enter a unique site name through the graphical user interface (GUI).
   1.2. Enter the site home DRL.
   1.3. Enter notes
2. Create site-domain records associated with a site.
3. Create a session with logged-pages for a site.
   3.1. Using the GUI, invoke a browser to access a site home DRL.
   3.2. The browser uses a proxy agent to record HTTP transmissions on the site.
   3.3. ETS creates a new session, and creates a logged-page record as the profiler browses each page.
   3.4. Browse the site for all pages related to tracked events.
   3.5. Force the session to expire.
4. Review the session and the logged-pages. For each event to be tracked:
   4.1. Locate the trigger page.
   4.2. Locate all pages that contain attributes related to the event.
   4.3. If the trigger page is loaded by a redirect, mark the redirect as the pre-trigger page.
5. Create site-page records for each logged-page identified in 4.
   5.1. Enter a name for the new site-page.
   5.2. Create the identification-method for the site-page.
      5.2.1. Choose identification-method algorithm.
      5.2.2. If signature-matching, enter signature by copying and pasting text from the rendered logged-page, or from the HTML source of the logged-page.
      5.2.3. If key word-indexing, enter keywords and threshold values using the GUI.
6. Create event-type record.
   6.1. Enter 3 character event-type identifier.
   6.2. Enter description.
   6.3. Associate attributes under which event-related content will be parsed.
      6.3.1. Create any new attributes required to parse event-related content
         6.3.1.1. Enter new attribute's name.

TABLE 6-continued

- 6.3.1.2. Enter notes to describe attribute.
- 6.3.1.3. Select attribute-data-type.
- 6.3.2. Add attribute to event.
7. Create site-events to be tracked.
    - 7.1. Select the site.
    - 7.2. Select event-type to be tracked on the site.
    - 7.3. Add all site-pages associated with the site-event.
        - 7.3.1. Identify the event-sequence-code for the site-page.
            - 7.3.1.1. If the site-page is a trigger, enter T.
            - 7.3.1.2. If the site-page is a pre-trigger, enter P.
            - 7.3.1.3. Otherwise, enter any value.
        - 7.3.2. If the site-page contains page attributes used by the event, create a parse-method.
            - 7.3.2.1. Select parser type (HTTP or HTML).
            - 7.3.2.2. Some parsers require a parse-map to parse page-attributes.
                - 7.3.2.2.1. Retrieved the logged-page record.
                - 7.3.2.2.2. Create a parse-map based on the logged-page record.
                - 7.3.2.2.3. Associate parse-map with the parse-method.
            - 7.3.2.3. Enter additional parser-specific parameters.
8. Validate data identification and event detection.
    - 8.1. Retrieve the session created in 3 for validation.
    - 8.2. Reset expired session for page identification
    - 8.3. Review reprocessed session to confirm that pages are properly identified
    - 8.4. If pages are not properly identified, amend the identification-method.
    - 8.5. Reset session for event detection.
    - 8.6. Review reports to confirm that expected events were detected.
    - 8.7. If events are not properly detected, then
        - 8.7.1. If a site-page was not identified, amend the identification-method.
        - 8.7.2. If the trigger page was not logged, create a new session and log the pages neccessary to trigger the event.
        - 8.7.3. If the site-pages and triggers are not properly associated, amend the site-page-event association.
9. Validate data extraction
    - 9.1. Retrieve the session created in 3 for validation.
    - 9.2. Reset the session for data extraction.
    - 9.3. For each identified-page with a parse-method:
        - 9.3.1. Review the extracted parse-attributes to confirm that the page was parsed properly
        - 9.3.2. If parse-attributes are not properly extracted, then amend the parse-map.
10. Export updated site profile data to production system Site profiles are preferably created in the profiling system and exported to the production system to assist in the tracking and reporting of online activity. On a periodic basis, site profiles are validated to ensure fidelity of report data. The following Table is an outline description of the profile validation process as performed by a profiler, according to an embodiment of the present invention:

As a variant to the preferred embodiment, an automated script may perform some of the validation steps described above. Following the identification of broken site profiles, an amendment process is initiated. The following Table provides an outline description of the profile amendment process as performed by a profiler, according to the present invention:

TABLE 7

1. Review production reports
    - 1.1. Review production parse error alert messages
        - 1.1.1. Determine if parse alert messages entail event profile repair
    - 1.2. Review event reports
        - 1.2.1. Review purchase summary report
        - 1.2.2. Review session detail report
            - 1.2.2.1. Mark for review all sessions with more than 40 page views and no events
            - 1.2.2.2. Mark for review all sessions with more than 1000 seconds duration and no events
    - 1.3. Review production profile reports
        - 1.3.1. Reconcile profile report event count with session detail report
        - 1.3.2. Mark for review sessions with events not appearing in session detail report
        - 1.3.3. Mark for review sessions with purchase events that have bad purchase total values
    - 1.4. View all sessions that have been marked for review.
        - 1.4.1. Determine if event profiles require repair
2. Compile list of event profiles requiring repair.
3. Initiate repair and recovery (described below)

TABLE 8

1. Determine nature of event profile repair
2. Repair the profile
    2.1. Create, import or reuse a session with logged-pages for a site.
        2.1.1. If a session exists with the required logged-pages, retrieve the existing session
        2.1.2. Otherwise, import session and logged-page records from production system
        2.1.3. Or, create a new session by browsing the site.
    2.2. Repair site-page identification-methods
        2.2.1. Review logged pages from session created in (2.1)
            2.2.1.1. Locate the trigger page.
            2.2.1.2. Locate all pages that contain attributes related to the event.
            2.2.1.3. If the trigger page is loaded by a redirect, mark the redirect as the pre-trigger page.
        2.2.2. Create or modify site-page records.
            2.2.2.1. Create or modify the identification-method for the site-page.
                2.2.2.1.1. Choose identification-method algorithm.
                2.2.2.1.2. If signature-matching, enter signature by copying and pasting text from the rendered logged-page, or from the HTML source of the logged-page.
                2.2.2.1.3. If keyword-indexing, enter keywords and threshold values using the GUI.
    2.3. Repair parse-methods
        2.3.1. Select parser type (HTTP or HTML).
        2.3.2. Some parsers require a parse-map to parse page-attributes.
            2.3.2.1. Retrieve the logged-page record.
            2.3.2.2. Create a parse-map based on the logged-page record.
            2.3.2.3. Associate parse-map with the parse-method.
        2.3.3. Enter additional parser-specific parameters.
3. Validate data identification and event detection.
    3.1. Retrieve the session for validation.
    3.2. Reset expired session for page identification
    3.3. Review reprocessed session to confirm that pages are properly identified
    3.4. If pages are not properly identified, amend the identification-method.
    3.5. Reset session for event detection.
    3.6. Review reports to confirm that expected events were detected.
    3.7. If events are not properly detected, then
        3.7.1. If a site-page was not identified, amend the identification-method.
        3.7.2. If the trigger page was not logged, create a new session and log the pages necessary to trigger the event.
        3.7.3. If the site-pages and triggers are not properly associated, amend the site-page-event association.
4. Validate data extraction
    4.1. Retrieve the session for validation.
    4.2. Reset the session for data extraction.
    4.3. For each identified-page with a parse-method:
        4.3.1. Review the extracted parse-attributes to confirm that the page was parsed properly
        4.3.2. If parse-attributes are not properly extracted, then amend the parse-map.
5. Export updated site profile data to production system
6. Recover/repair event data
    6.1. Reset all sessions marked for review.
    6.2. Review re-processed sessions to confirm data identification.
    6.3. Review re-processed sessions to confirm data extraction.
    6.4. Review profile reports to confirm event detection.
    6.5. Re-generate production reports According to a preferred embodiment of the present invention, the profile validation and amendment processes occur on a bi-weekly cycle. Thus, reports are regenerated on the same cycle. Following the successful validation of a site profile for a sufficient time period, HTTP transmission records may be purged from the database. Site profiles are preferably versioned and dated, to allow for the reprocessing of archived HTTP transmissions.

Figure 6:
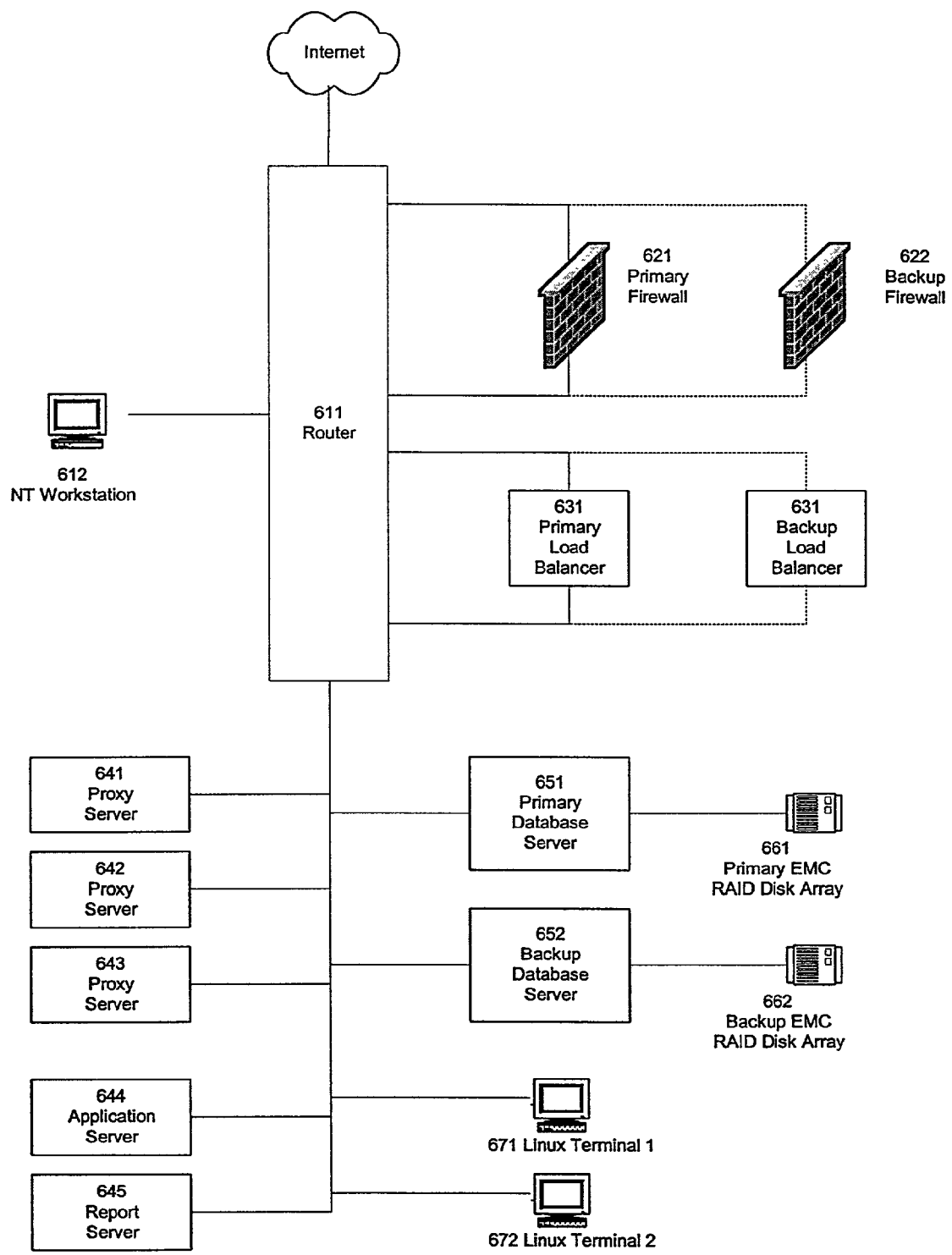
FIG. 6 is a schematic diagram depicting the production system architecture according to the present invention.

According to a preferred embodiment of the present invention, the production system has a redundant, distributed architecture. The distributed architecture allows for scalability without imposing a great development burden. It also provides full redundancy which safeguards against component failure, thus ensuring a high level of availability. FIG. 6 is a schematic diagram depicting the production system architecture according to the present invention.

According to the production system architecture of an embodiment of the present invention, a firewall 621 protects the system from external network-based attacks. A failover firewall 622 is configured to handle network traffic should the primary firewall fail. A load balancer 631 distributes inbound network traffic among three application web servers, 641, 642 and 643. A failover load balancer 632 is configured to handle network traffic should the primary load balancer fail.

Figure 7:
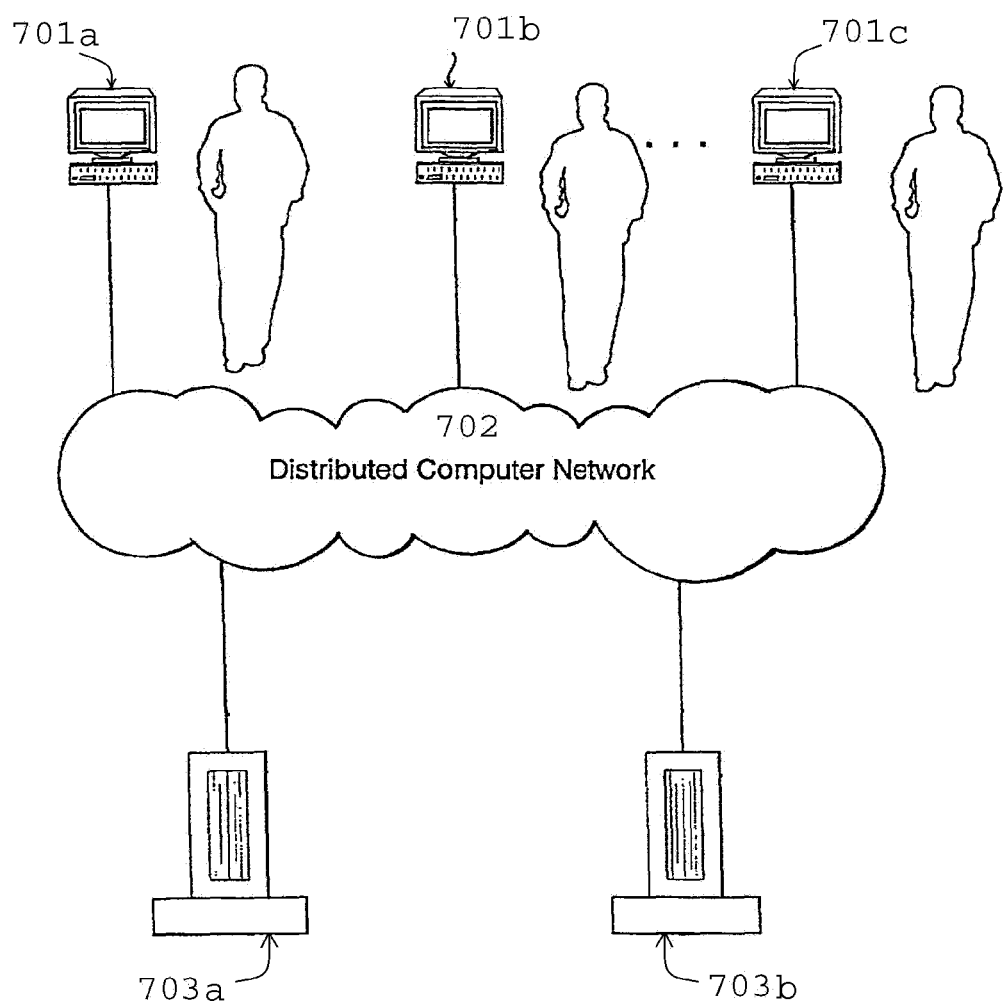
FIG. 7 is an overview of an environment in which an embodiment of the present invention may be used.
Figures 8A, 8B:
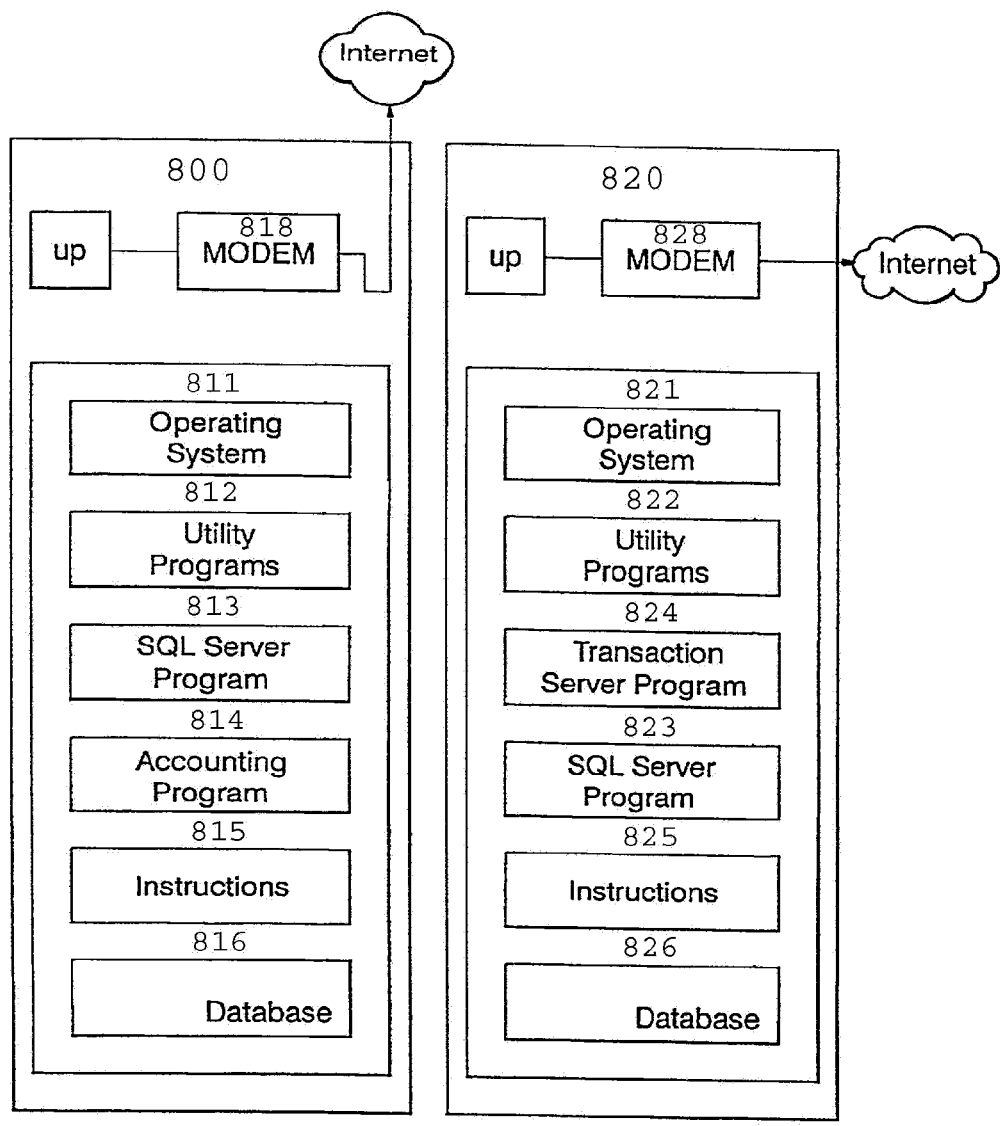
FIG. 8A and FIG. 8B are diagrammatic representations of embodiments of one or more servers within a distributed network as used in the practice of the present invention.

The proxy servers 641-643 handle the bulk of the transaction processing. Proxy agents are deployed on the proxy servers. The system architecture allows for the addition of proxy servers to accommodate increases in load. The system architecture implements primary and failover database subsystems, each with a distinct database server 651 and 652, and a distinct RAID array 661 and 662 for storage. The identification, extraction and analysis functions of the application architecture of the present invention are deployed at the application server 644. The reporting server 645 houses the reporting module and makes web-based reports and XML feeds available to external clients. Administrative systems 612, 671 and 672 are used for monitoring traffic, system and component failures, and responds to error conditions by sending notification messages. FIG. 7, provides an overview of a distributed client-server environment used with the embodiments. Client computers 701a, 701b, 701c are coupled through a distributed network 702 to servers 703a and 703b. FIGS. 8A and 8B provide representations of exemplary servers in the distributed network of FIG. 7, and used with the various embodiments. The server system 800 in FIG. 8A includes an operating system 811, utility programs 812, SQL services server program 813, an accounting program 814, instructions 815, and database 816. The server system 820 in FIG. 8B, is similarly configured with an operating system 821, utility programs 822, SQL server program 823, however instead of an accounting program 814, the service includes a transaction server program 824, as well as instructions 825, and database 826. Services 800 and 820 independently connect to the Internet using modems 818 and 828.

It should be understood by those skilled in the art that such is provided only by way of illustrative example and should in no manner be construed to limit the invention as described herein. Numerous modifications and alternate embodiments of the invention will occur to those skilled in the art. Accordingly, it is intended that the invention be limited only in terms of the following claims.

What is claimed is:

1. An apparatus comprising:
a digital tracking system connected to a user browser and a Web server on the Internet, the system adapted to perform operations that include, for at least one session:
providing to the user browser a Web page containing a URL specifying both an address of a computer-programmed tracking system and information that specifies a URL on the Web server;
upon receipt by the tracking system of a Web page request from the user browser, determining a Web server URL from the Web page request;
identifying and extracting captured information indicating that the user browser has requested the Web server URL;
storing the captured information stored within a database;
encoding an original URL as part of the tracking system's URL path to construct at least one rewritten URL;
embedding said at least one rewritten URL in a response such that a browser request to at least one said rewritten embedded URL is sent to the tracking system;
providing site management, including associating objects with one another; and
causing the Web page specified by the Web server URL to be returned to the user browser, wherein the causing is carried out such that the Web page specified by the Web server URL to be returned to the user includes redirecting the user browser to the Web page on the Web browser; and
providing data analysis of said least one session, reporting of data derived from said at least one session, or both.

2. The apparatus of claim 1, wherein the operations include the providing data analysis of at least one session.

3. The apparatus of claim 2, further including the operation of producing, based on said at least one session, at least one of a session detail report, an event detail report, a purchase detail report, and a purchase summary report.

4. The apparatus of claim 2, further including the operation of associating an object with another object.

5. The apparatus of claim 1, wherein the operations include the reporting of data derived from said at least one session.

6. The apparatus of claim 5, wherein the reporting includes reporting via an interface to an external client.

7. The apparatus of claim 6, wherein the reporting via the interface to the external client includes reporting via an XML feed to the external client.

8. The apparatus of claim 7, further including the operation of producing, based on said at least one session, at least one of a session detail report, an event detail report, a purchase detail report, and a purchase summary report.

9. The apparatus of claim 7, further including the operation of associating an object with another object.

10. The apparatus of claim 6, wherein the reporting via the interface to the external client includes reporting via a Web interface to the external client.

11. The apparatus of claim 10, further including the operation of producing, based on said at least one session, at least one of a session detail report, an event detail report, a purchase detail report, and a purchase summary report.

12. The apparatus of claim 10, further including the operation of associating an object with another object.

13. The apparatus of claim 6, further including the operation of producing, based on said at least one session, at least one of a session detail report, an event detail report, a purchase detail report, and a purchase summary report.

14. The apparatus of claim 6, further including the operation of associating an object with another object.

15. The apparatus of claim 5, further including the operation of producing, based on said at least one session, at least one of a session detail report, an event detail report, a purchase detail report, and a purchase summary report.

16. The apparatus of claim 5, further including the operation of associating an object with another object.

17. The apparatus of claim 1, wherein the operations include both the providing data analysis of at least one session and the reporting of data derived from said at least one session.

18. The apparatus of claim 17, wherein the reporting includes reporting via an interface to an external client.

19. The apparatus of claim 18, wherein the reporting via the interface to the external client includes reporting via an XML feed to the external client.

20. The apparatus of claim 19, further including the operation of producing, based on said at least one session, at least one of a session detail report, an event detail report, a purchase detail report, and a purchase summary report.

21. The apparatus of claim 19, further including the operation of associating an object with another object.

22. The apparatus of claim 18, wherein the reporting via the interface to the external client includes reporting via a Web interface to the external client.

23. The apparatus of claim 22, further including the operation of producing at least one of a session detail report, an event detail report, a purchase detail report, and a purchase summary report.

24. The apparatus of claim 22, further including the operation of associating an object with another object.

25. The apparatus of claim 18, further including the operation of producing, based on said at least one session, at least one of a session detail report, an event detail report, a purchase detail report, and a purchase summary report.

26. The apparatus of claim 18, further including the operation of associating an object with another object.

27. The apparatus of claim 17, further including the operation of producing, based on said at least one session, at least one of a session detail report, an event detail report, a purchase detail report, and a purchase summary report.

28. The apparatus of claim 17, further including the operation of associating an object with another object.

29. The apparatus of claim 1, further including the operation of producing, based on said at least one session, at least one of a session detail report, an event detail report, a purchase detail report, and a purchase summary report.

30. The apparatus of claim 1, further including the operation of associating an object with another object.

\* \* \* \* \*